July 10, 1962  J. L. CASSELL  3,043,995
BIPOLAR RECIPROCATING ALTERNATING CURRENT BELL MOTOR
Filed Nov. 4, 1960
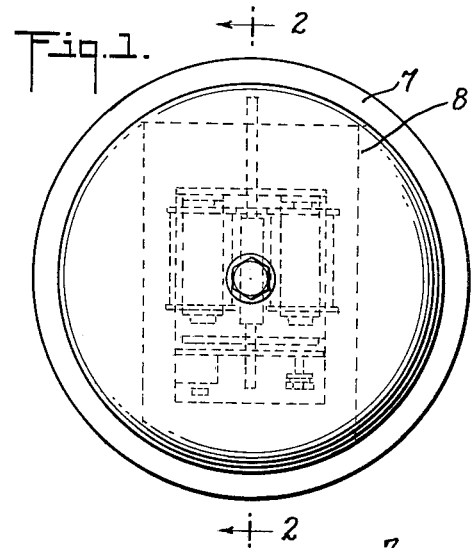
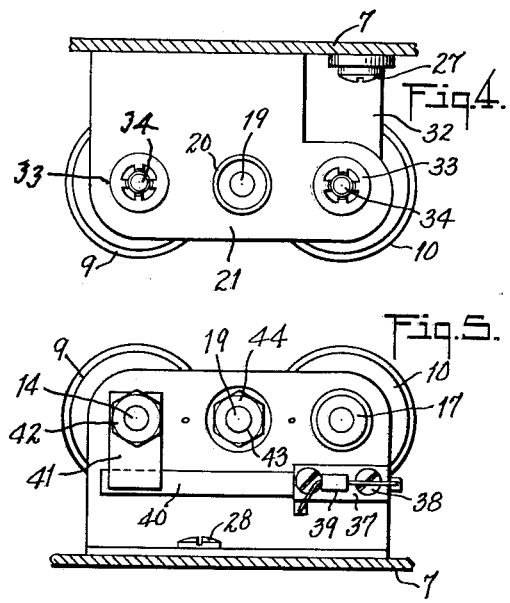
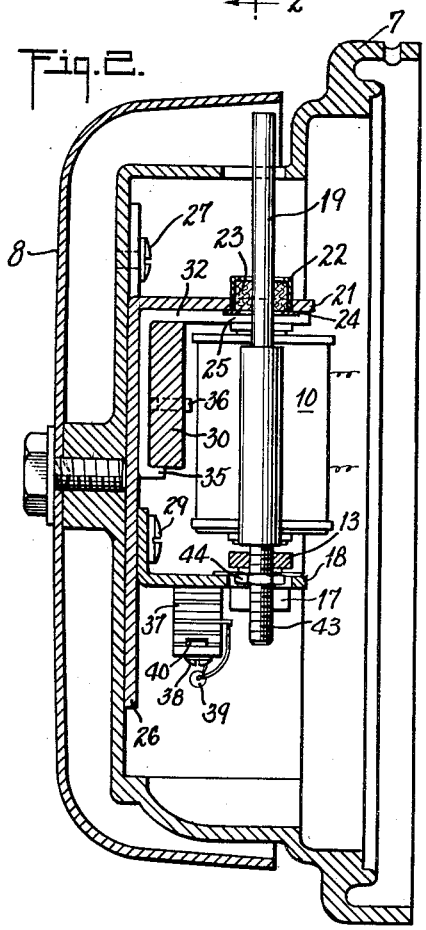
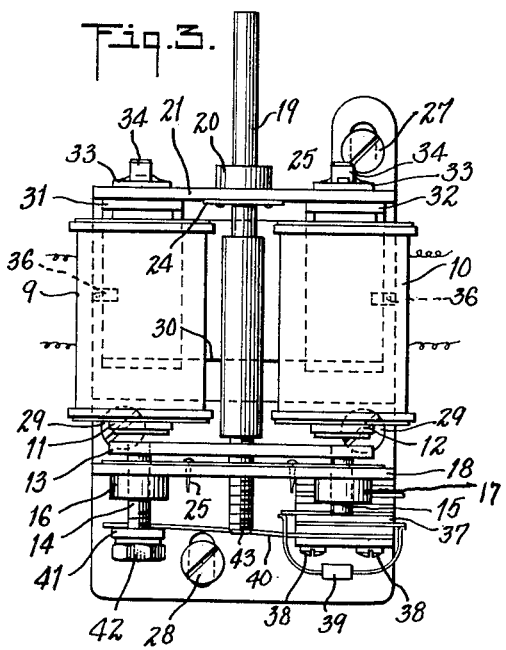
INVENTOR.
JOSEPH L. CASSELL
BY
*Philip S. Hogan*
ATTORNEY

United States Patent Office 3,043,995
Patented July 10, 1962

3,043,995
BIPOLAR RECIPROCATING ALTERNATING CURRENT BELL MOTOR
Joseph L. Cassell, New York, N.Y., assignor to The Reeve Electrical Co., Inc., New York, N.Y., a corporation of New York
Filed Nov. 4, 1960, Ser. No. 67,258
3 Claims. (Cl. 317—172)

The invention herein disclosed relates to alternating current bell motors and the objects of the invention primarily are to provide a motor of this type of simple, inexpensive construction, small in size but powerful in action and free of any parts or mechanisms that might detract from its efficiency or service.

Particularly it is an object of the invention to provide smooth free action of the bell striking hammer and to assure the continued smooth operation of the unit over long extended periods of use.

These and other desirable objects have been accomplished in part by the use of a bipolar magnet and by guiding the armature of the magnet for direct straight line movement and connecting the striker directly with this reciprocating armature.

Other important features of the invention are set forth and will appear in the course of the following specification.

The drawing accompanying and forming part of the specification illustrates a presently preferred embodiment of the invention. Structure, however, may be modified and changed as regards the immediate illustration, all within the true intent and scope of the invention as hereinafter defined and claimed.

FIG. 1 is a plan view of an electric bell incorporating features of the invention.

FIG. 2 is a vertical sectional view of the bell on substantially the plane of line 2—2 of FIG. 1, on an enlarged scale.

FIG. 3 is a front elevation of the motor unit removed from the bell housing.

FIG. 4 is a top plan view of the unit looking in the direction of the arrow 4 in FIG. 3.

FIG. 5 is a bottom plan view of the unit looking in the direction of arrow 5 of FIG. 3.

The general views, FIGS. 1 and 2, show the bell as made up of a hollow base 7 providing a housing for the motor unit and carrying the gong 8.

The motor unit is made up of a bipolar electromagnet having windings 9, 10 provided with polar extensions 11, 12 at the lower ends for an armature 13 mounted for straight reciprocating movement in respect to the poles.

Specifically the armature is shown as having dependent studs 14, 15 slidingly guided in felt lined bearings 16, 17 on a bottom bracket 18 and carrying at the center an upstanding striker rod 19 slidingly guided in a felt lined bearing 20 on the top bracket 21.

This arrangement provides a substantially frictionless three point guide system for the armature, assuring continuous, quiet, smooth and easy reciprocating action, requiring no servicing or other attention.

FIG. 2 shows how the felt bearings may be in the form of flanged sleeves 22 containing felt bearing washers 23 and mounted on supporting plates 24 secured by screw drive pins or similar fastenings 25 driven into the brackets 18 and 21 after the bearing sleeves have been passed through openings provided for them in these brackets.

The upper bracket 21 is shown in the form of a shelf projecting from a base plate 26 secured by top and bottom screws 27, 28 to the inner wall of the housing and the lower bracket 18 is shown attached to the base plate by screws 29, FIGS. 2 and 3.

The bracket structure described, as well as the housing, preferably are of nonmagnetic material.

A permanent magnet in the form of a small, flat, straight bar magnet 30 is located crosswise in back of the magnet windings and magnetically coupled to the upper ends of the magnet cores by L-shaped polar extensions 31, 32 embracing the ends of the permanent magnet and secured at the top to the underside of the upper bracket 21 by the same rivet washers 33 which secure cores 34 of the magnet to this shelf.

FIG. 2 shows how the magnetic polar extensions 31, 32 are angularly turned at the lower ends at 35 to hold the lower edges of the transversely disposed bar magnet 30 and FIG. 3 shows how small end brackets 36 attached to the back plate 26 confine the bar magnet against endwise movement.

A terminal block 37 attached to the lower bracket 18 by screws 38 provides mounting for all wire connections and also a support for the dry state rectifier 39 which is included in series with the magnet coils to reduce the action to half that of the supply circuit, that is, for example, to 30 reciprocations for a normal 60 cycle supply circuit.

A flat spring 40 extended from the terminal block over a lug 41 secured by nut 42 on the lower screw threaded end of the stud 14 provides a steady return force for the armature. The lug 41 is screw threaded on stud 14 and the nut 42 serves to lock the lug in position after it has been adjusted to regulate the tension of the spring.

Under some conditions it may be desirable to adjust the striker rod on the armature. For this purpose the rod is shown as having a screw threaded lower end 43 adjustably screwed in the armature and secured in adjusted relation by a lock nut 44.

The construction illustrated provides a simple, compact, small size, easily assembled, low cost, mechanically balanced, powerful unit free of pivotal connections and which operating at freer and quicker stroke but at reduced frequency creates a more agreeable bell tone and is more efficient, requiring less current and free of make and break or other such contact complications. The short, flat, straight bar magnet at the back of the magnet coils occupies but small space, and does not add objectionably to the bulk or cost of the complete unit.

What is claimed is:

1. A bell motor comprising a bipolar electromagnet, an armature cooperable with the poles of said electromagnet and having projecting guide studs substantially in line with the poles of said electromagnet, a striker rod projecting from said armature between said guide studs, substantially frictionless parallel guides for said striker rod and guide studs providing straight line reciprocating guiding means for said armature and striker rod, a short flat permanent bar magnet in back of said electromagnet and having polar extensions at opposite ends of the same in magnetic connection with the poles of said electromagnet and a return spring mechanically connected with one of the guide studs of said reciprocating armature.

2. A bell motor comprising a back plate of nonmagnetic material having a forwardly projecting shelf, bipolar magnet coils having cores projecting through said shelf, a permanent bar magnet transversely disposed in back of said coils, polar extensions of magnetic material extending from the ends of said bar magnet into position between the ends of said cores and shelf, means securing said cores and polar extensions in said relation to said shelf, a striker rod between the coils of said bipolar magnet, a bearing for one end of said striker rod on said shelf, an armature attached to the opposite end of said striker rod and in cooperative relation with said cores, dependent guide studs on said armature substantially in line with the cores and guide bearings for said studs and whereby said armature is guided for reciprocating movement at three points at opposite ends of the magnet coils.

3. An electromagnetic actuator comprising a bipolar electromagnet, top and bottom brackets at opposite ends of said bipolar electromagnet, the poles of said electromagnet being secured to said top bracket, an armature having projecting guide studs in line with the poles of said electromagnet, frictionless guides for said guide studs on said bottom bracket, a striker rod projecting from said armature through said top bracket, a frictionless guide for said striker rod on said top bracket, a permanent bar magnet supported by said top bracket in back of said electromagnet and having polar extensions at opposite ends in magnetic connection with the ends of the electromagnet poles connected with said top bracket and a return spring connected wtih said reciprocating armature.

References Cited in the file of this patent
UNITED STATES PATENTS

| | | |
|---|---|---|
| 792,692 | Burell | June 20, 1905 |
| 2,380,293 | Carroll | July 10, 1945 |
| 2,594,497 | Robinson | Apr. 29, 1952 |